US012434733B2

United States Patent
Lei et al.

(10) Patent No.: US 12,434,733 B2
(45) Date of Patent: Oct. 7, 2025

(54) SENSOR DATA TRANSFER WITH SELF ADAPTIVE CONFIGURATIONS FOR AUTONOMOUS DRIVING VEHICLE

(71) Applicants: Baidu USA LLC, Sunnyvale, CA (US); APOLLO INTELLIGENT DRIVING TECHNOLOGY (BEIJING) CO., LTD., Beijing (CN)

(72) Inventors: Hualei Lei, Beijing (CN); Manjiang Zhang, Sunnyvale, CA (US)

(73) Assignees: BAIDU USA LLC, Sunnyvale, CA (US); APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/912,787

(22) PCT Filed: Jul. 29, 2022

(86) PCT No.: PCT/CN2022/109151
§ 371 (c)(1),
(2) Date: Sep. 19, 2022

(87) PCT Pub. No.: WO2024/021083
PCT Pub. Date: Feb. 1, 2024

(65) Prior Publication Data
US 2024/0208529 A1    Jun. 27, 2024

(51) Int. Cl.
*B60W 60/00* (2020.01)
*B60W 50/08* (2020.01)

(52) U.S. Cl.
CPC .......... *B60W 60/001* (2020.02); *B60W 50/08* (2013.01); *B60W 2556/45* (2020.02)

(58) Field of Classification Search
CPC .............. B60W 50/08; B60W 60/001; B60W 2556/45; G01S 7/4808; G01S 13/867; H04L 67/12
See application file for complete search history.

(56) References Cited

U.S. PATENT DOCUMENTS

| | | | |
|---|---|---|---|
| 10,576,891 B2 * | 3/2020 | Neff | H04N 23/66 |
| 11,402,842 B2 * | 8/2022 | Liu | G05D 1/0257 |
| 2009/0113232 A1 * | 4/2009 | Park | H04L 41/0893 709/224 |
| 2019/0137622 A1 * | 5/2019 | Lopez-Hinojosa | G01S 13/867 |
| 2019/0384291 A1 * | 12/2019 | Michalakis | G06N 3/006 |
| 2020/0177885 A1 * | 6/2020 | Brugman | H04N 19/31 |
| 2021/0405651 A1 * | 12/2021 | Pan | G05D 1/227 |
| 2022/0058402 A1 * | 2/2022 | Hunt | H04N 23/661 |
| 2022/0121210 A1 * | 4/2022 | Herman | G06N 3/08 |

* cited by examiner

*Primary Examiner* — Vincent H Tran
(74) *Attorney, Agent, or Firm* — WOMBLE BOND DICKINSON (US) LLP

(57) ABSTRACT

A sensor system for an autonomous driving vehicle (ADV) includes a sensor interface coupled to a plurality of sensors, a host interface coupled to a host system of the ADV, and a self-adaptive sensor transfer unit coupled between the sensor interface and the host interface. The self-adaptive sensor transfer unit includes a sensor monitor module, configured to monitor a data rate of sensor data received from a sensor, and a configuration control module, configured to: receive a target data rate from the host via the host interface; receive the monitored data rate of the sensor data; and control the data rate of the sensor data to be within a threshold of the target data rate.

20 Claims, 9 Drawing Sheets

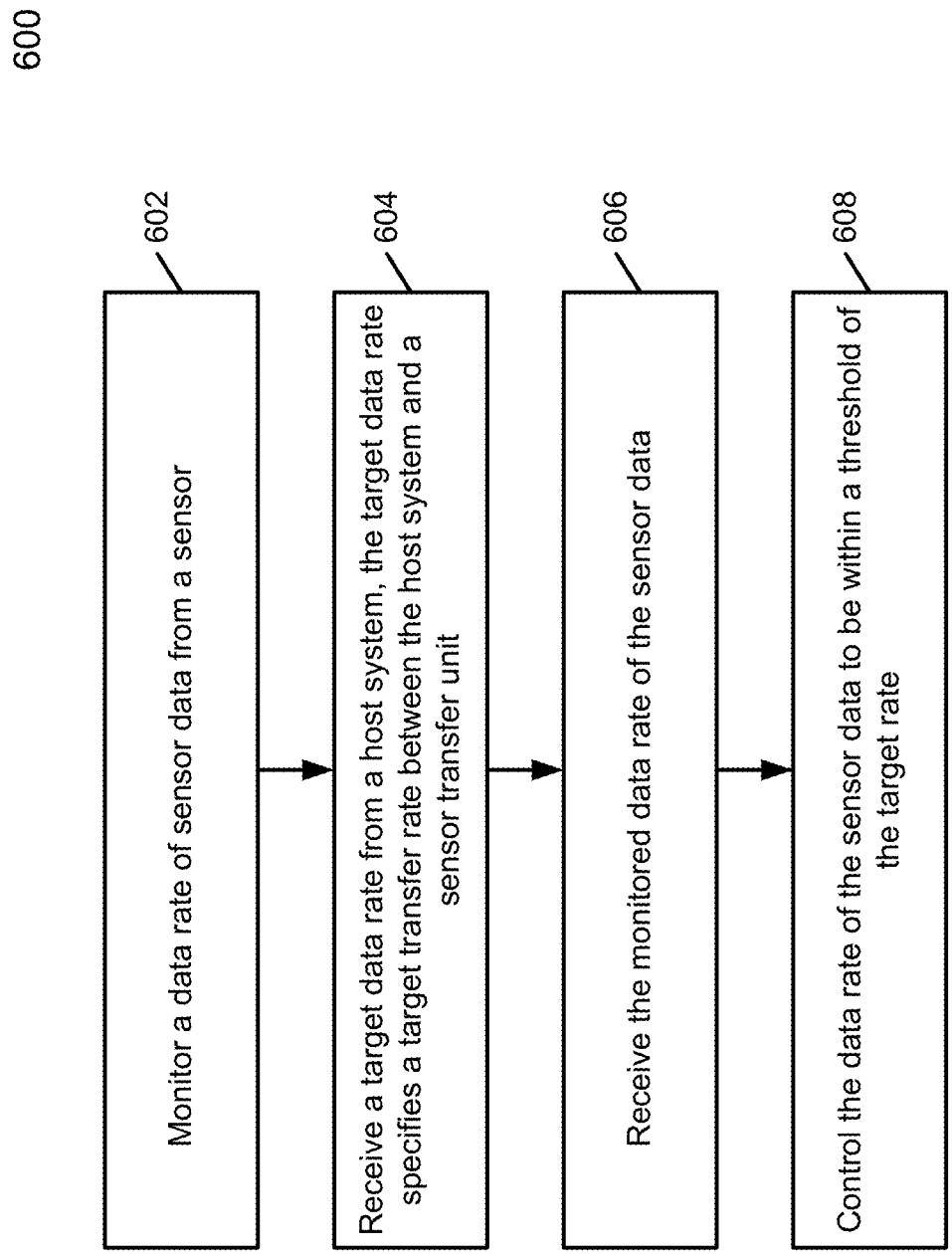

SENSOR DATA TRANSFER WITH SELF ADAPTIVE CONFIGURATIONS FOR AUTONOMOUS DRIVING VEHICLE

CROSS-REFERENCE TO RELATED APPLICATION

This application is a National Stage of International Application No. PCT/CN2022/109151, filed Jul. 29, 2022, which is hereby incorporated by reference in its entirety.

TECHNICAL FIELD

Embodiments of the present disclosure relate generally to operating autonomous driving vehicles. More particularly, embodiments of the disclosure relate to sensor data transfer with self-adaptive configurations for autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Level 4 and level 5 autonomous driving vehicles require high resolution camera sensors or imaging radar sensors to enhance sensing capability of a surrounding environment. Reliable and flexible sensor data transfers schemes can improve autonomous driving system functionalities and efficiencies.

SUMMARY

According to one aspect of the present disclosure, a computer-implemented method is provided, including: monitoring a data rate for sensor output data from a sensor, wherein the sensor is one of a plurality of sensors mounted on an autonomous driving vehicle (ADV), a host system of the ADV receives sensor data from the sensors, the sensor data correspond to a driving environment surrounding the ADV, and the host system plans a planning trajectory to autonomously drive the ADV based on the planning trajectory; receiving a target data rate from the host system; receiving the monitored data rate of the sensor data; and controlling the data rate of the sensor data to be within a threshold of the target data rate.

According to one aspect of the present disclosure, a sensor system for an autonomous driving vehicle (ADV) is provided, including: a sensor interface coupled to a plurality of sensors mounted on an autonomous driving vehicle (ADV); a host interface coupled to a host system of the ADV, wherein the host system receives sensor data from the sensors, the sensor data correspond to a driving environment surrounding the ADV, and the host system plans a planning trajectory to autonomously drive the ADV based on the planning trajectory; and a self-adaptive sensor transfer unit coupled between the sensor and host interface, the self-adaptive sensor transfer unit includes: a sensor monitor module, configured to monitor a data rate of sensor data received from a sensor; a configuration control module, configured to: receive a target data rate from the host system via the host interface; receive the monitored data rate of the sensor data from the sensor monitor module; and control the data rate of the sensor data to be within a threshold of the target data rate.

According to one aspect of the present disclosure, a circuit for an ADV is provided, including: a sensor interface coupled to a plurality of sensors mounted on an autonomous driving vehicle (ADV); a host interface coupled to a host system of the ADV, wherein the host system receives sensor data from the sensors, the sensor data correspond to a driving environment surrounding the ADV, and the host system plans a planning trajectory to autonomously drive the ADV based on the planning trajectory; and a self-adaptive sensor transfer unit coupled between the sensor interface and the host interface, the self-adaptive sensor transfer unit includes: a sensor monitor circuit to monitor a data rate of sensor data received from a sensor; a configuration control circuit to: receive a target data rate from the host system via the host interface; receive the monitored data rate of the sensor data from the sensor monitor circuit; and controlling the data rate of the sensor data to be within a threshold of the target data rate.

BRIEF DESCRIPTION OF THE DRAWINGS

Embodiments of the disclosure are illustrated by way of example and not limitation in the figures of the accompanying drawings in which like references indicate similar elements.

FIG. 6 is a flow diagram illustrating a process to transfer sensor data with self-adaptive configurations according to one embodiment.

DETAILED DESCRIPTION

Figure 1:
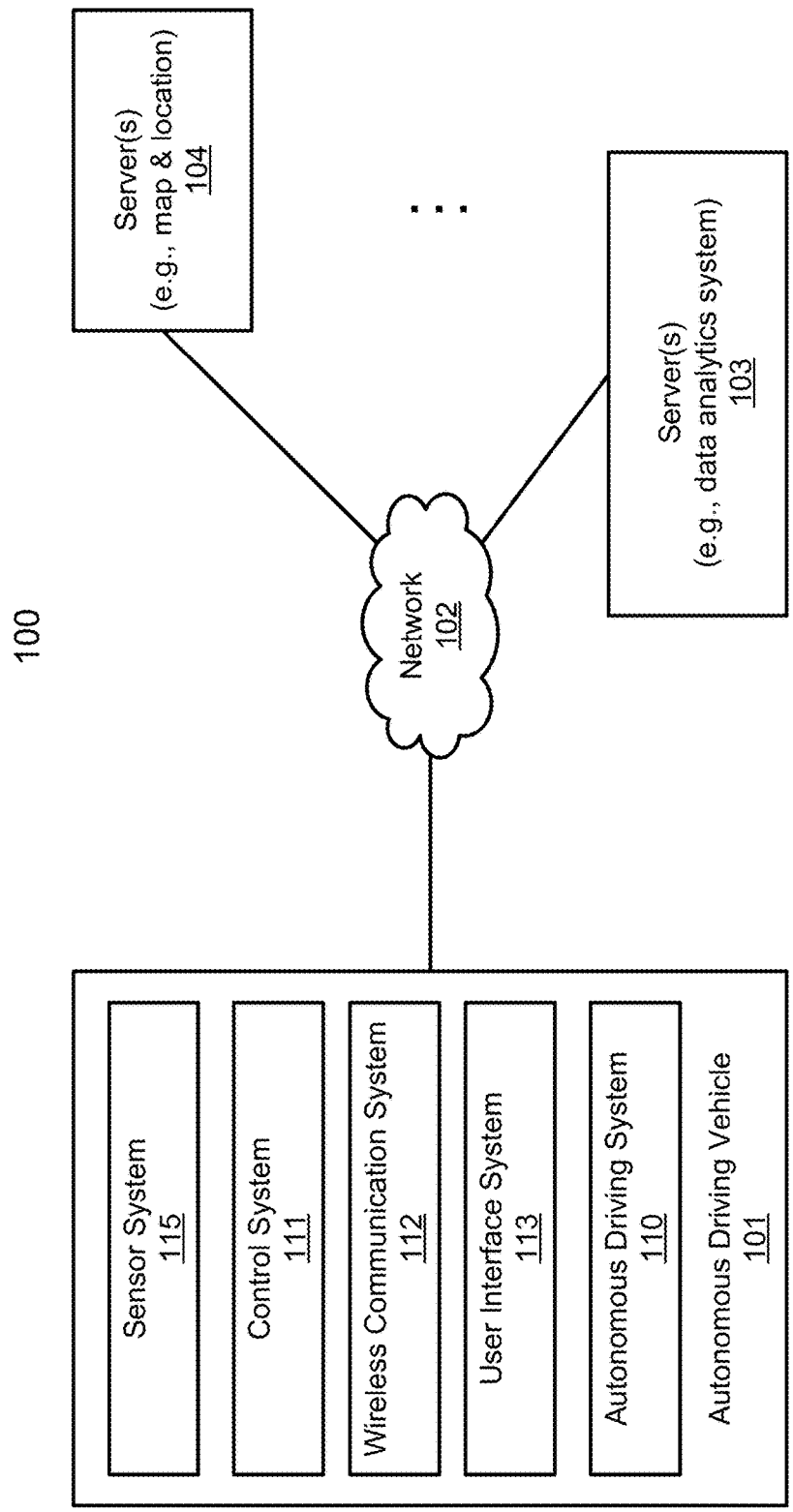
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a sensor data transfer unit is configurable to monitor sensor specific information of sensors coupled to the sensor data transfer unit and automatically controls a data transfer rate and the output data format prior to transferring the data to a host system according to the sensor monitoring information and configuration information received from the host system. The automatic adjustments of the data transfer rate and the switching of the output formats improves adaptability of a sensor system that is attached with different sensors.

When sensor data are captured, the sensor data are typically stored on sensor device memory or the sensor data are transmitted to the memory of a host system in a fixed first-in first-out (FIFO) manner. Such a data transfer technique may not be flexible to meet different application requirements.

According to a first aspect, a method comprises: monitoring a data rate of sensor data from a sensor, where the sensor is one of a plurality of sensors mounted on an autonomous driving vehicle (ADV). A host system of the ADV receives sensor data from the sensors, where the sensor data correspond to a driving environment surrounding the ADV. The host system plans a planning trajectory to autonomously drive the ADV based on the planning trajectory. The method comprises receiving a target data rate from the host via the host interface; receiving the monitored data rate; and controlling the data rate of the sensor data to be within a threshold of the target data rate.

According to a second aspect, a sensor system of an autonomous driving vehicle (ADV) includes a sensor interface coupled to a plurality of sensors, a host interface coupled to a host system of the ADV, and a self-adaptive sensor transfer unit coupled between the sensor and host interface. The self-adaptive sensor transfer unit includes a sensor monitor module, configured to monitor a data rate of sensor data received from a sensor, and a configuration control module, configured to: receive a target data rate from the host via the host interface; receive the monitored data rate from the sensor monitor module; and control the data rate of the sensor data to be within a threshold of the target data rate.

According to a third aspect, a circuit for an ADV includes a sensor interface coupled to a plurality of sensors mounted on an autonomous driving vehicle (ADV). The circuit includes a host interface coupled to a host system of the ADV, where the host system receives sensor data from the sensors. The sensor data correspond to a driving environment surrounding the ADV, and the host system plans a planning trajectory to autonomously drive the ADV based on the planning trajectory. The circuit includes self-adaptive sensor transfer unit coupled between the sensor interface and the host interface. The self-adaptive sensor transfer unit includes a sensor monitor circuit to monitor a data rate of sensor data received from a sensor; and a configuration control circuit to: receive a target data rate from the host via the host interface; receive the monitored data rate from the sensor monitor circuit; and control the data rate of the sensor data to be within a threshold of the target data rate.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
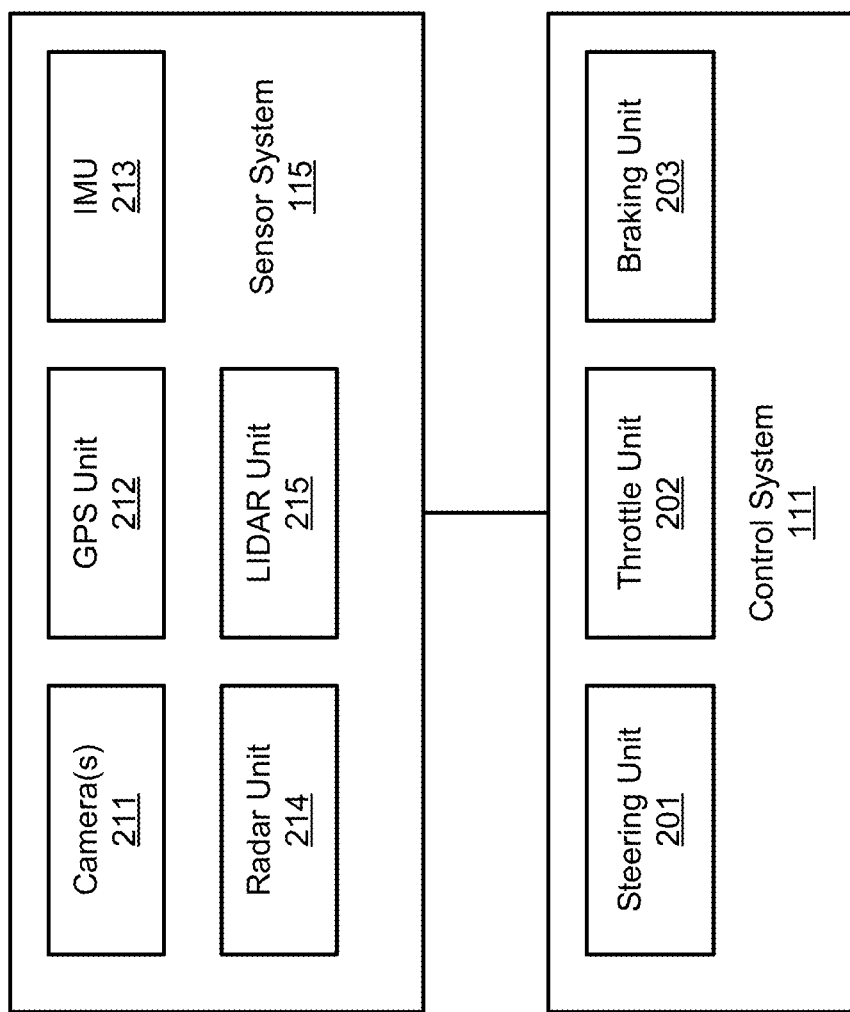
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3A:
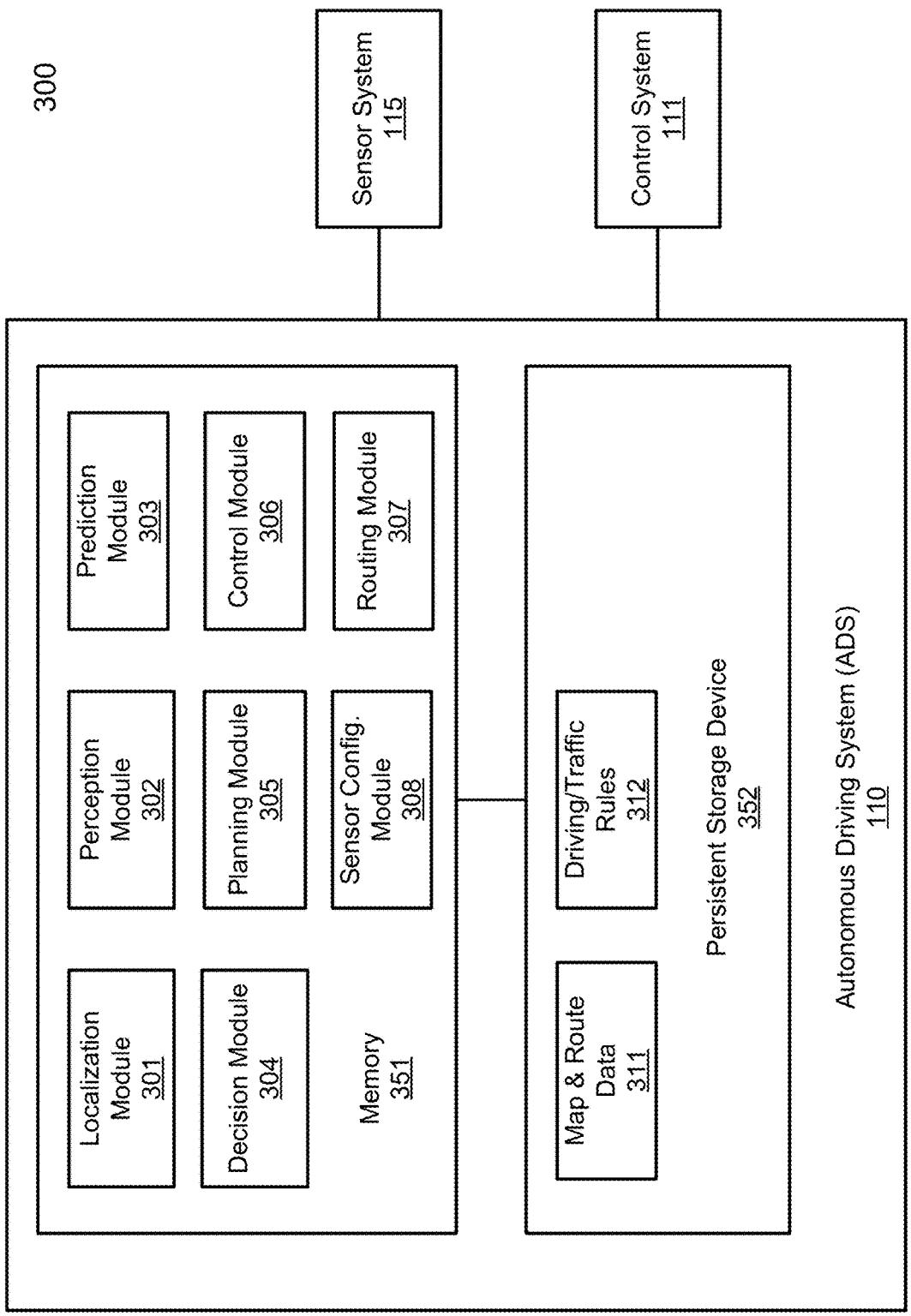
FIGS. 3A-3B are block diagrams illustrating an example of an autonomous driving system used with an autonomous driving vehicle according to one embodiment.
Figure 3B:
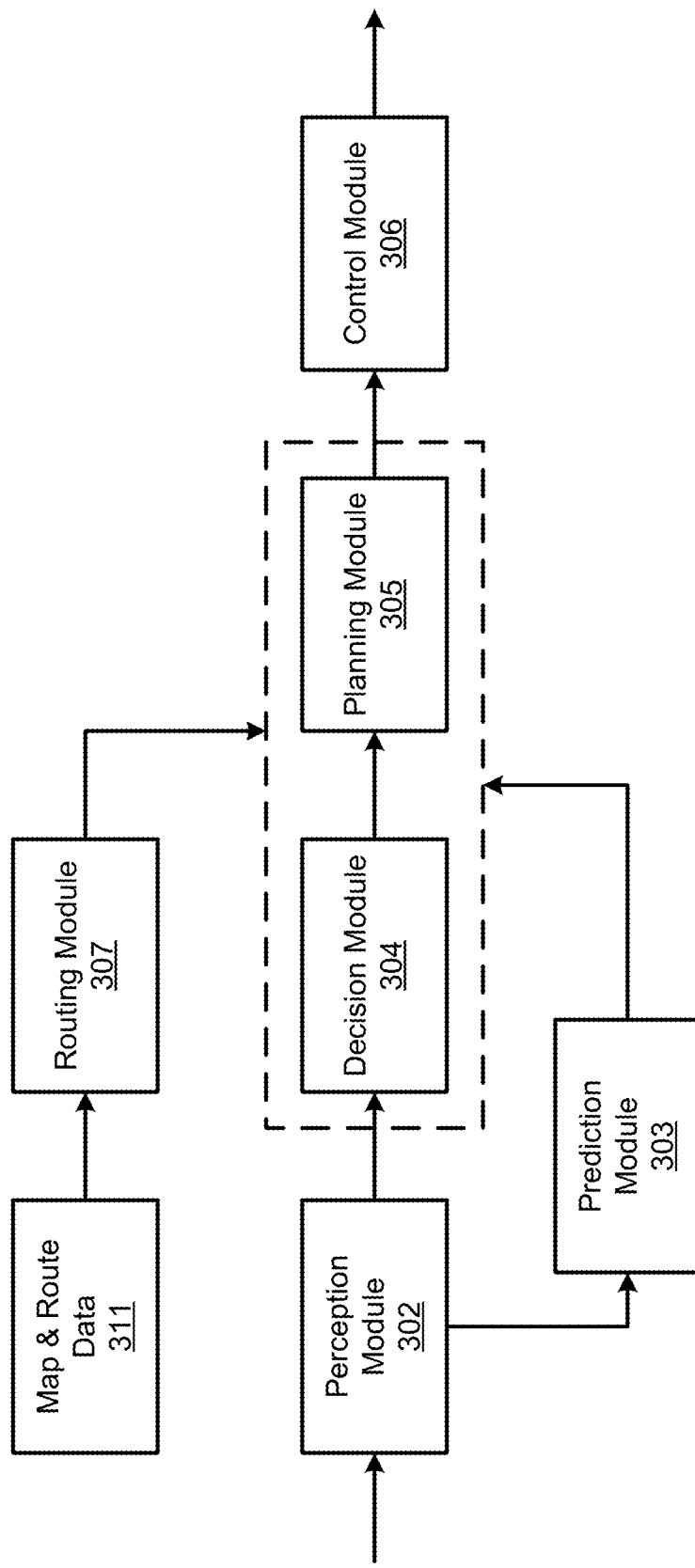

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and sensor configuration module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Sensor configuration module 308 can be used to configure or select sensor data rates, sensor data output formats, recovery schemes, and/or any post-process techniques applied to sensor output data. In one embodiment, sensor configuration module 308 can include an application programming interface (API) for host system 110 to communication to a sensor transfer unit of the sensor system 115. In another embodiment, sensor configuration module 308 can include a user interface for an operator to select or configure the sensor configuration settings. A messaging protocol can be used to send the configuration and/or selection commands to a sensor transfer unit and/or sensor system 115 of the ADV.

Figure 4:
FIG. 4 is a block diagram illustrating an example of a decision and planning system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
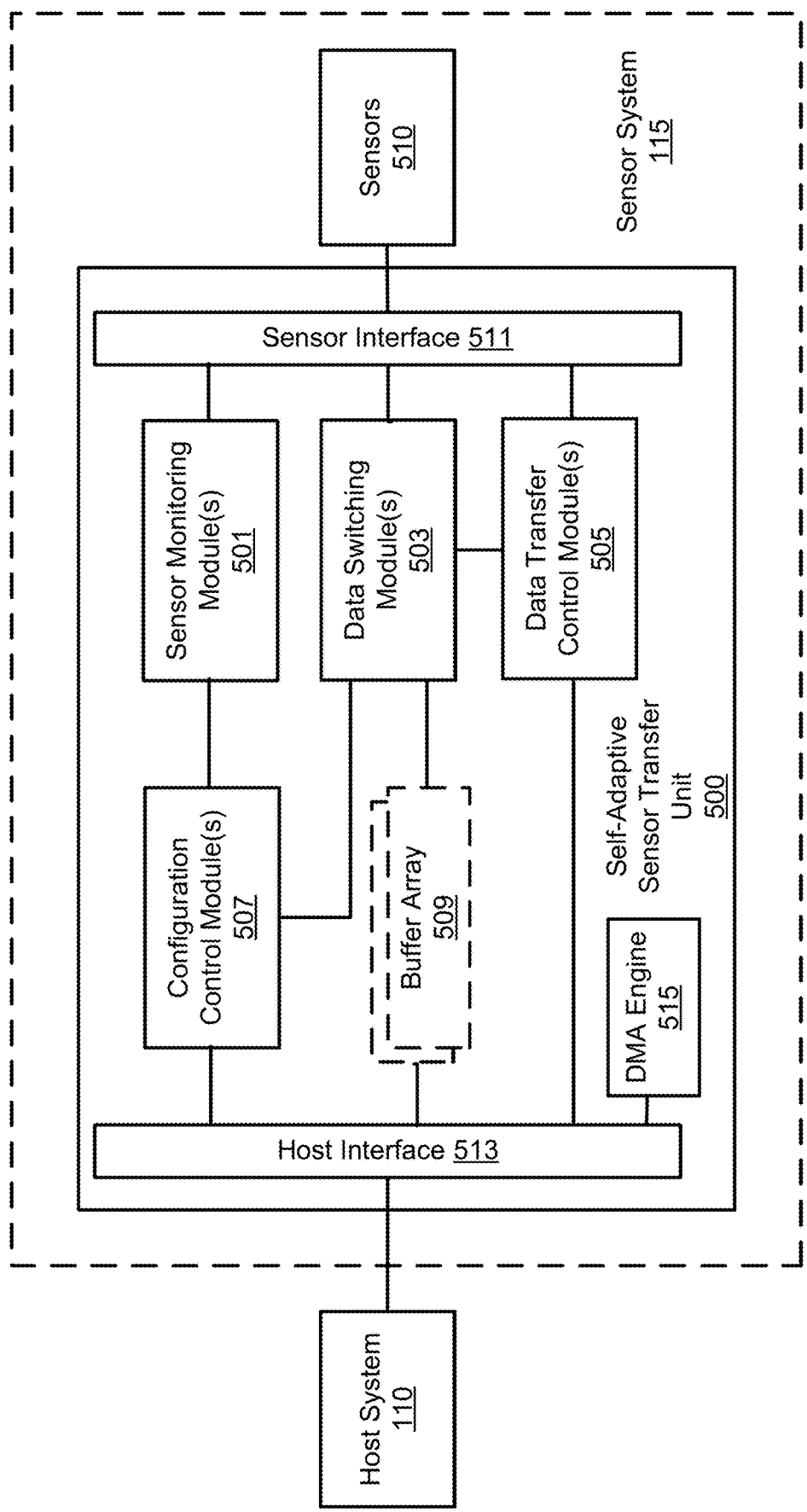
FIG. 5A is a block diagram illustrating an example of a sensor system according to one embodiment.

FIG. 5A is a block diagram illustrating an example of a sensor system according to one embodiment of the invention. Referring to FIG. 5A, sensor system 115 includes a number of sensors 510 and a self-adaptive sensor transfer unit 500 coupled to host system 110. Host system 110 can represent a planning and control system as described above, which may include at least some of the modules as shown in FIGS. 3A and 3B. Self-adaptive sensor transfer unit 500 may be implemented in a form of an FPGA device or an ASIC (application specific integrated circuit) device. In one embodiment, sensor transfer unit 500 includes one or more sensor monitoring modules or logic 501, data conversation/switching modules or logic 503, data transfer control modules or logic 505, configuration control modules or logic 507, and dynamic memory access (DMA) engine 515. Modules 501-503 can communicate with sensors 510 via a sensor interface 511 and modules 505-507, 515 can communicate with host system 110 via host interface 513. Optionally, an internal or external buffer array 509 may be utilized for buffering the sensor data for data transfers between unit 500 and host system 110.

In one embodiment, sensor monitoring module 501 is configured to receive sensor data from sensors 510 via sensor interface 511 and process the sensor data to determine a data flow rate and a data format for each corresponding sensor. In one embodiment, module 501 further error checks the sensor data and/or recovers sensor data according to a recovery scheme.

Data switching module 503 can be configured to switch between different output and input data channels. For example, module 503 can provide sensor system 115 with M source to N output selections, where M and N are integers greater than or equal to 1. Here, the selections can support different sensors having different input formats and can output the sensor data in different output formats. For example, an input format for an imaging sensor can be the luma-chroma (YUV) color space and a desire output format can be the red-green-blue (RGB) color space. Module 503 can switch the input/output to YUV/RGB formats to support the YUV input format and to generate sensor data in the RGB format. Note that different sensors have correspond available input formats according to the sensor device manufacturers but the host system may require the sensor data in specific formats, thus, module 503 can provide the automatic switchable M inputs to N outputs conversation configurable for various types of sensors. Although YUV and RGB formats are shown as the example, other color spaces/formats are possible. Further, the data formats can correspond to other sensor types, e.g., LIDAR, ultrasound, temperature, and/or RADAR, etc.

Configuration control module 507 can receive sensor monitoring information from module 501 and can transmit the monitoring information (e.g., sensor data rate, data format, indications of the types of mounted sensors, etc.) to a host system 110. Configuration control module 507 can also receive selection/configuration requests from host system via an API. The requests can include data rate settings and/or format settings to control a data rate and/or format of the sensor data output to host system. In one embodiment, configuration control module 507 can send instructions to switching module 503 for a selection of the M to N selections to output a selected format.

Data transfer control module 505 can receive control settings correspond to a sensor data rate that controls the rate of data output by sensors 510. Data transfer control module 505 can send the control settings to sensors 510 to adjust the output data rate of sensors 510. Data transfer control module 505 can additionally apply a setting to module 503 for module 503 to interpolate or drop frames for the sensor data.

In one embodiment, processed sensor data may be temporarily stored in buffer array 509 before the data are transmitted to host system 110. In one embodiment, host system 110 can configure sensors 510 to capture sensor data in a collaborative and/or synchronized manner, such that the sensor data can be utilized to perceive a driving environment surrounding the vehicle at any point in time.

Sensor interface 511 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 513 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor monitoring module 501 is configured to handle different types of sensors and to detect their respective data formats, flow rates, and communication protocols. In one embodiment, sensor monitoring module 501 detects the type of sensors by reading and capturing information regarding the sensors and sends such information to host system 110. Host system 110 can use driver files or a list of known sensors to identify the type of sensors and communicates the identifying information to monitoring module 501. In one embodiment, sensor monitoring module 501 or configuration control module 507 includes the sensor identifying information save in a buffer and can determine the type of sensors by matching one or more criteria of the sensor identifying information against information captured from sensors 510. According to one embodiment, each of sensors 510 is associated with a specific channel for monitoring of the sensor data and transferring of processed sensor data between host system 110 and the corresponding sensor. Each channel includes a specific sensor monitoring module and a specific data switching module that have been configured or programmed to handle the corresponding sensor data and protocol, as shown in FIG. 5B.

Figure 5B:
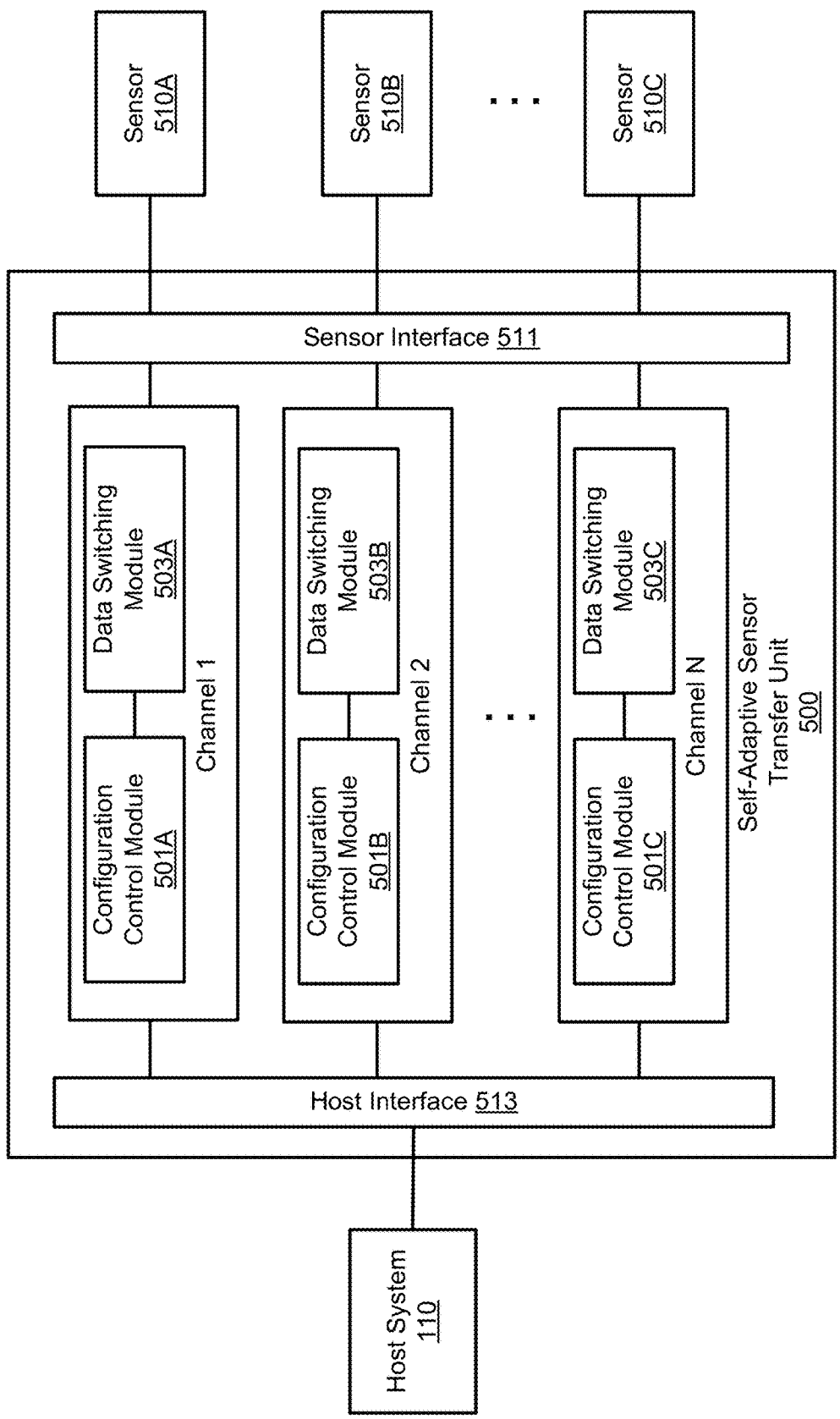
FIG. 5B is a block diagram illustrating the sensor system of FIG. 5A having multiple communication channels according to one embodiment.

Referring now to FIG. 5B, sensor monitoring modules 501A-501C are specifically configured to process sensor data obtained from sensors 510A-510C respectively. Note that sensors 510A-510C may the same or different types of sensors. Sensor monitoring modules 501A-501C can be configured (e.g., software configurable) to monitor different formats of sensor data for different types of sensors. For example, if sensor 510A is a camera, monitoring module 501A can be figured to monitor the pixel data representing an image captured by camera 510A. Similarly, if sensor 510A is a LIDAR device, processing module 501A is configured to monitor LIDAR data (e.g., point clouds). That is, according to one embodiment, dependent upon the specific type of a particular sensor, monitoring module can be configured to monitor the corresponding sensor data using a specific process or method corresponding to the type of sensor data.

Data switching modules 503A-503C can be configured to operate to receive different input data formats, as different kinds of sensor data may be received in different formats. Data switching modules 503A-503C can be configured to output data in particular formats, at a particular data rate as host system 110 may require different speed or timing requirements for different types of sensor data. According to one embodiment, each of data switching modules 503A-503C can be configured to switch between M inputs and N outputs, where M and N are integers greater than or equal to 1. In one embodiment, data switching modules 503A-503C can interpolate consecutive frames to create new frames to increate a frame rate of the sensor. In one embodiment, data switching modules 503A-503C can drop one out of every few frames to decrease a frame rate of the sensor.

In one embodiment, sensor transfer unit 500 can operate in one of a low latency mode, a high bandwidth mode, or a memory mode (also referred to as a fixed memory mode).

When operating in a low latency mode, according to one embodiment, a data switching module (e.g., data switching module 503) is configured to send the sensor data received from a sensor to the host system as soon as possible with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data switching module (e.g., data switching module 503) is configured to accumulate the sensor data received from a sensor up to a predetermined amount but is still within the bandwidth the connection between the data switching module and the host system 110. The accumulated sensor data is then transferred to the host system 110 in a batch that maximum the bandwidth of the connection between the data switching module and host system 110. Typically, the high bandwidth mode is utilized for a sensor that produces a large amount of sensor data. Examples of such sensor data include camera pixel data. In one embodiment, the accumulated sensor data are temporarily stored in buffer array 509.

When operating in a memory mode, according to one embodiment, a data switching module is configured to write the switched sensor data received from a sensor directly to a memory location of a mapped memory of host system 110, similar to a shared memory page. Examples of the sensor data to be transferred using memory mode include system status data such as temperature, fans speed, etc. In one embodiment, one or more dynamic memory access (DMA) channels are used to transfer data from sensors to the host system.

FIG. 6 is a flow diagram illustrating a process 600 to transfer sensor data with self-adaptive configurations according to one embodiment. Process 600 may be performed by processing logic which may include software, hardware, or a combination thereof. For example, process 600 may be performed by self-adaptive sensor transfer unit 500 of FIG. 5A.

At block 602, processing logic monitors a data rate of sensor data from a sensor. The sensor is one of a plurality of sensors mounted on an autonomous driving vehicle (ADV). A host system of the ADV receives sensor data from the sensors, and the sensor data correspond to a driving environment surrounding the ADV. The host system plans a planning trajectory to autonomously drive the ADV based on the planning trajectory.

For example, the sensor data can be received in a data stream or in batches and the data stream or batches can represent data captured by the sensor. Processing logic can monitor the sensor data by identifying signals/syntax/tag data transmitted from a sensor to the sensor transfer unit. For example, processing logic can identify start of frame (SOF) signals for sensor data from an imaging sensor. Other types of signals can be monitored for other sensor data types.

At block 604, processing logic receives a target data rate from the host system, the target data rate specifying a target transfer rate between the host system and the sensor transfer unit.

The target data rate can be a configurable rate specifying a rate of data to be transferred between host system 110 and sensor transfer unit 500 of FIG. 5A. The sensor data rate can be configured by host system 110 via an application programmable interface (API). For example, a target data rate can be configured to 30 frames per second (FPS) for imaging sensors.

At block 606, processing logic receives the monitored data rate of sensor output data.

At block 608, processing logic automatically control the data rate of the sensor data to be within a threshold of the target data rate.

In one embodiment, controlling the data rate of the sensor data further includes adjusting a configuration setting of the sensor. For example, if the target data rate is 30 FPS and the sensor supports an output data rate at 30 FPS, processing logic can send a command to the sensor and select the 30 FPS output rate at the sensor.

In one embodiment, controlling the data rate of the sensor data further includes interpolating (e.g., add new frames for every Q frames) frames from the sensor or removing a frame in every P frames from a sensor, or a combination thereof, where P and Q are a positive integer greater than 1.

Processing logic can interpolate, e.g., add frames, for every Q frames. For example, if the monitored data rate is 20 FPS, processing logic can generate a frame for every consecutive frames (e.g., every two frames) or any other number of frames by interpolation methods. The generated frames are interweaved in the 20 FPS and the 20 FPS can be upconverted to a higher FPS, e.g., 30 FPS. Interpolation technique uses two frames to create a frame and the generated frame represents a new frame that has data values midway between the two frames.

Processing logic can drop one of every P frames, where P is an integer greater than 1. For example, if the monitored data rate is larger (e.g., 45 FPS) than the target data rate (e.g., 30 FPS), processing logic can drop one frame from every 3 received frames to trim the FPS by a third to result in 30 FPS.

In one embodiment, processing logic further receives M inputs and generates any of N outputs from the M inputs, where M and N are positive integers, M is greater than 0, and N is greater than 1. The M inputs can refer to the data formats output by the sensors. For example, if camera sensor can output in YUV or RGB formats, M can refer to the two, YUV and RGB, formats. N outputs refer to the data formats output by sensor system 115. For example, host system 110 may be processing data in the YCbCr, or any other color spaces. In this case, processing logic can select the M to N as either YUV to YCbCr, or RGB to YCbCr. Thus, here, data format conversion can be performed at sensor system 115 by sensor transfer unit 500.

In one embodiment, processing logic further post-process the sensor data. For example, processing logic can apply a filter to sensor data (e.g., de-noise, smoothing, etc.), or trimming a frame size (e.g., 800 by 640 pixels) of sensor data to another frame size (e.g., 300 by 240 pixels), or changing the data bit formats from Integer 32 bits to integer 12 bits, etc.

In one embodiment, one or more dynamic memory access (DMA) channels are used to transfer sensor data to the host system.

For example, sensor transfer unit 500 of FIG. 5A can include a DMA engine 515 that can be a scatter and gather block DMA engine. DMA engine 515 can be a bus-master DMA used by a FPGA board. Here, bus mastering is a feature supported by many bus architectures that enables a device connected to the bus to initiate DMA transactions. This is in contrast to a third-party DMA where a host system DMA controller actually does the transfer.

In one embodiment, processing logic further provides a recovery mode to automatically recover erroneous sensor data for the sensors. For example, if the sensors provide parity bits or error correction codes (ECC), processing logic can check the sensor data against the parity bits or ECC to determine if the sensor data is erroneous and, if possible, correct the erroneous bits to recover the sensor data at a physical layer.

In one embodiment, processing logic further provides a selection of a configurable recovery mode to automatically recover a subset of erroneous sensor data from the sensor.

For example, host system can select a recovery mode (e.g., automatic mode or user config mode) for the sensor transfer unit using an API. The automatic mode can instruct the sensor transfer unit to automatically recover data when possible. The user config mode can instruct the sensor transfer unit to automatically recover some but not all sensor data, e.g., particular types of sensor data are recoverable.

Figure 7:
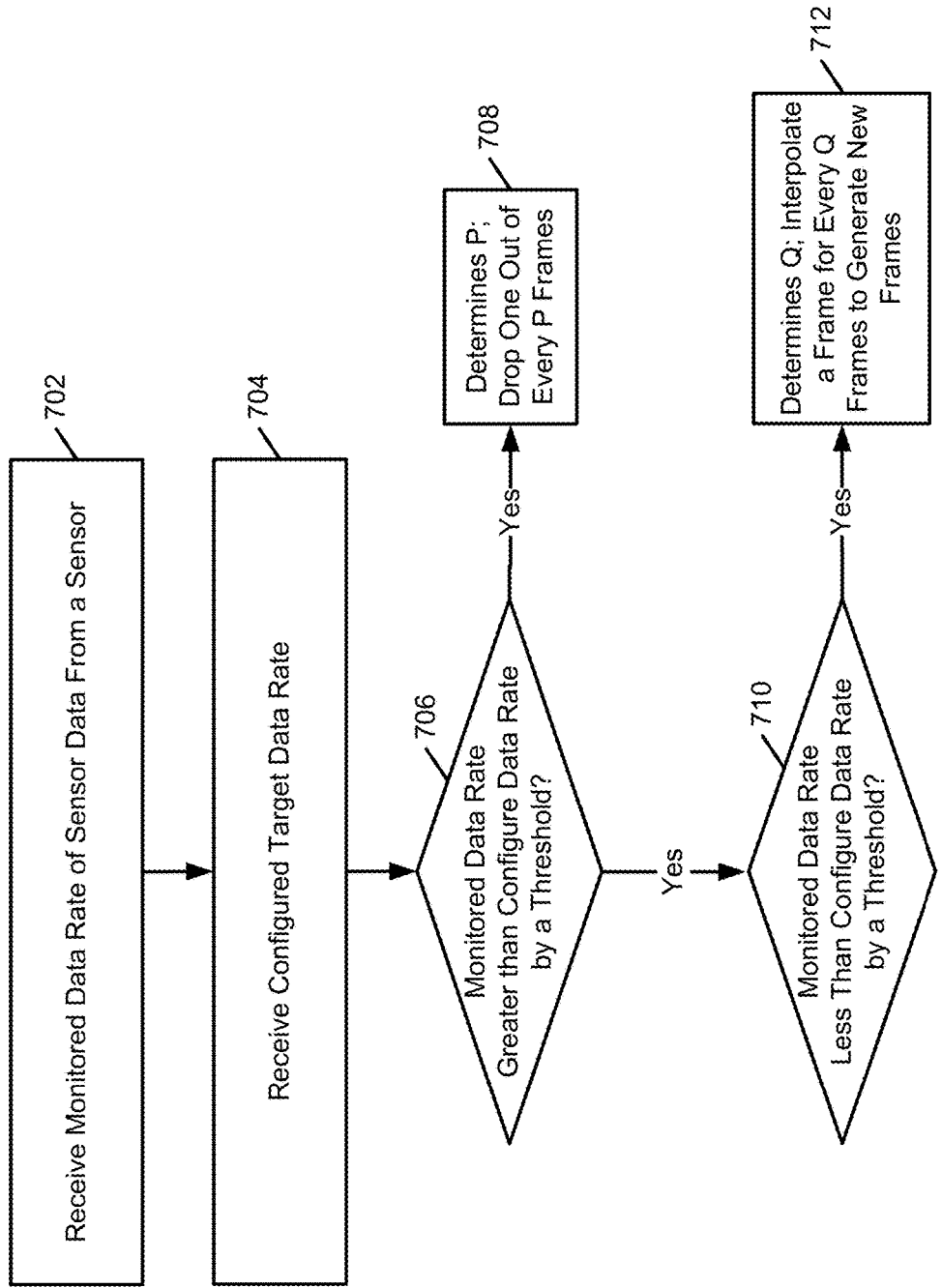
FIG. 7 is a flow diagram illustrating a process to adapt a sensor data rate according to one embodiment.

FIG. 7 is a flow diagram illustrating a process 700 to adapt a sensor data rate according to one embodiment. Process 700 may be performed by processing logic which may include software, hardware, or a combination thereof. For example, process 700 may be performed by configuration control module 507 of FIG. 5A.

At block 702, processing logic receives monitoring data rate a data rate of sensor data from a sensor. The sensor can be one of a plurality of sensors mounted on an autonomous driving vehicle (ADV). A host system of the ADV receives sensor data from the sensors and the sensor data correspond to a driving environment surrounding the ADV. The host system plans a planning trajectory to autonomously drive the ADV based on the planning trajectory.

At block 704, processing logic receives configurable target data rate. The configurable target data rate can be received from the host system.

At block 706, processing logic determines whether the monitoring data rate is greater than the configured data rate by a threshold (such as 10%).

For example, if the monitoring data rate is 45 FPS and the configured target data rate is 30 FPS then the monitoring data rate is greater than the configured data rate by the threshold, and processing logic proceeds to block 708.

At block 708, processing logic determines P, where P is an integer greater than 1 and dropping one frame out of every P frames would bring the monitoring data rate to be within a threshold of the configured target data rate. Processing logic then proceeds to drop one out of every P frames.

For example, in this case, processing logic determines dropping one frame out of every 3 frames will achieve the target data rate of 30 FPS and proceeds to drop one frame out of every 3 frames so the monitored data rate of 45 FPS from a sensor can be trimmed to 30 FPS.

If the monitoring data rate is not greater than the configured data rate by the threshold, processing logic proceeds to block 710.

At block 710, processing logic determines whether the monitoring data rate is less than the configured data rate by a threshold (such as 10%).

For example, if the monitoring data rate is 45 FPS and the configured target data rate is 60 FPS then the monitoring data rate is less than the configured data rate by the threshold, and processing logic proceeds to block 712.

At block 712, processing logic determines Q, where Q is an integer greater than 1 and interpolating one frame out of every Q frames would bring the monitoring data rate to be within a threshold of the configured target data rate. Processing logic then proceeds to interpolate one out of every Q frames to generate the new frames.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
monitoring a data rate for sensor output data from a sensor, wherein the sensor is one of a plurality of sensors mounted on an autonomous driving vehicle (ADV), a host system of the ADV receives sensor data from the sensors, the sensor data correspond to a driving environment surrounding the ADV, and the host system plans a planning trajectory to autonomously drive the ADV based on the planning trajectory;
receiving a target data rate from the host system;
receiving the monitored data rate of the sensor data; and
controlling the data rate of the sensor data to be within a threshold of the target data rate.

2. The method of claim 1, wherein controlling the data rate of the sensor data further comprises adjusting a configuration setting of the sensor.

3. The method of claim 1, wherein controlling the data rate of the sensor data further comprises removing a frame for every P frames received from the sensor or interpolating every Q frames received from the sensor, wherein P and Q are a positive integer greater than 1.

4. The method of claim 1, further comprising receiving M inputs and to generate N outputs from the M inputs, wherein M and N are positive integers, M is greater than 0, and N is greater than 1.

5. The method of claim 1, wherein one or more dynamic memory access (DMA) channels are used to transfer data to the host system.

6. The method of claim 1, further comprising providing a recovery mode to automatically recover erroneous sensor data from the sensor.

7. The method of claim 1, further comprising providing a user selection of a configurable recovery mode to automatically recover a subset of erroneous sensor data for the sensor.

8. A sensor system for an autonomous driving vehicle (ADV), comprising:
a processor; and
a memory coupled to the processor to store instructions, which when executed by the processor, cause the processor to
monitor a data rate for sensor output data from a sensor, wherein the sensor is one of a plurality of sensors mounted on an autonomous driving vehicle (ADV), a host system of the ADV receives sensor data from the sensors, the sensor data correspond to a driving environment surrounding the ADV, and the host system plans a planning trajectory to autonomously drive the ADV based on the planning trajectory;
receive a target data rate from the host system;
receive the monitored data rate of the sensor data; and
control the data rate of the sensor data to be within a threshold of the target data rate.

9. The sensor system of claim 8, wherein the processor is further caused to adjust a configuration setting of the sensor to control the data rate of the sensor data received from the sensor.

10. The sensor system of claim 8, wherein the processor is further caused to adjust a frame rate by removing a frame for every P frames received from the sensor or interpolating every Q frames received from the sensor, wherein P and Q are a positive integer greater than 1.

11. The sensor system of claim 8, wherein the processor is further caused to receive M inputs and to generate N outputs from the M inputs, wherein M and N are positive integers, M is greater than 0, and N is greater than 1.

12. The sensor system of claim 8, wherein the processor is further caused to transfer data to the host system.

13. The sensor system of claim 8, wherein the processor is further caused to provide a recovery mode to automatically recover erroneous sensor data from a sensor.

14. The sensor system of claim 8, wherein the processor is further caused to provide a user a configurable recovery mode to automatically recover a subset of erroneous sensor data for the sensor.

15. A non-transitory machine-readable medium having instructions stored therein, which when executed by a processor, cause the processor to:
   monitor a data rate for sensor output data from a sensor, wherein the sensor is one of a plurality of sensors mounted on an autonomous driving vehicle (ADV), a host system of the ADV receives sensor data from the sensors, the sensor data correspond to a driving environment surrounding the ADV, and the host system plans a planning trajectory to autonomously drive the ADV based on the planning trajectory;
   receive a target data rate from the host system;
   receive the monitored data rate of the sensor data; and
   control the data rate of the sensor data to be within a threshold of the target data rate.

16. The non-transitory machine-readable medium of claim 15, wherein the processor is further caused to adjust a configuration setting of the sensor to control the data rate of the sensor data received from the sensor.

17. The non-transitory machine-readable medium of claim 15, wherein the processor is further caused to adjust a frame rate by removing a frame for every P frames received from the sensor or interpolating every Q frames received from the sensor, wherein P and Q are a positive integer greater than 1.

18. The non-transitory machine-readable medium of claim 15, wherein the processor is further caused to receive M inputs and to generate N outputs from the M inputs, wherein M and N are positive integers, M is greater than 0, and N is greater than 1.

19. The non-transitory machine-readable medium of claim 15, wherein the processor is further caused to to transfer data to the host system.

20. The non-transitory machine-readable medium of claim 15, wherein the processor is further caused to: provide a recovery mode to automatically recover erroneous sensor data for a sensor.

* * * * *